Sept. 12, 1933.                 J. B. FOX                    1,926,520
                          HOT POINT REGROOVER
                          Filed Sept. 1, 1932
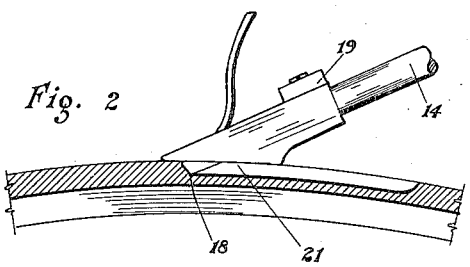
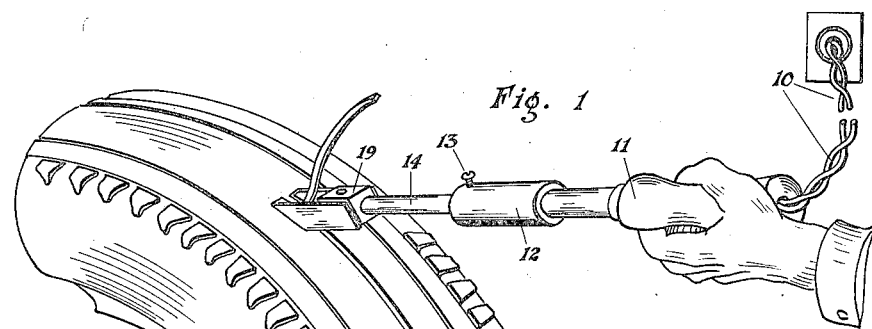
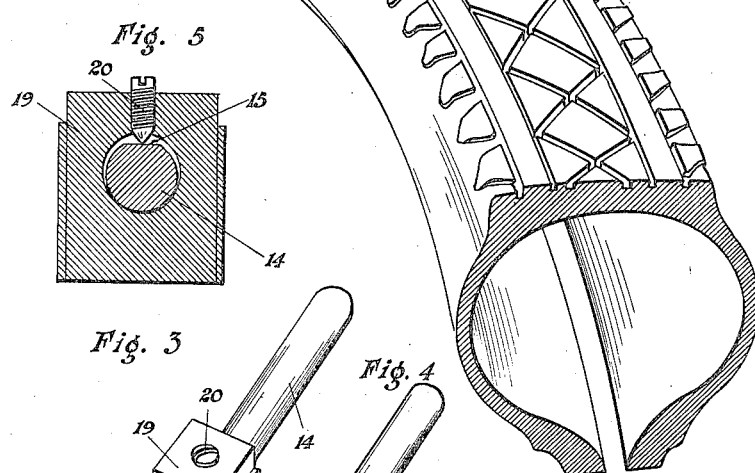
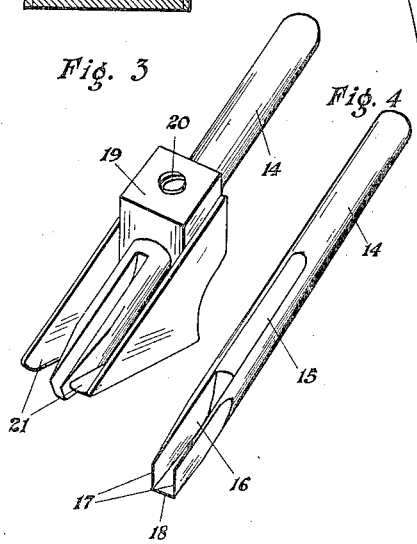
J. B. Fox, Inventor
By Emil F. Lange, Attorney Patented Sept. 12, 1933

1,926,520

UNITED STATES PATENT OFFICE 1,926,520

HOT POINT REGROOVER

Jay B. Fox, Lincoln, Nebr.

Application September 1, 1932. Serial No. 631,376

3 Claims. (Cl. 30—20)

My invention relates to devices for cutting the treads in tires which have become wholly or partly smooth from use.

The primary object of the invention is the provision of a device of the kind specified which will cut the treads in the tire with grooves which closely simulate the grooves of a new tire.

Another of my objects is the provision of a simple tool in which the portion of the tire to be cut is kept at a temperature sufficient to insure smooth cutting.

Another of my objects is the provision of a groove cutting tool which is adapted to be heated during cutting and which rides on a shoe which is kept warm at a temperature considerably below that of the cutting tool.

Another of my objects is the provision of a cutting tool which is easily sharpened.

Another of my objects is the provision of a cutting tool combined with a shoe together with an adjustment between the cutting tool and the shoe which regulated the depth of cut of the cutting tool.

Another of my objects is the provision of a heated cutting tool mounted in a shoe with partial air insulation in order to maintain the shoe at a temperature lower than that of the cutting tool.

Another object of my invention is the provision of a cutting tool which is adapted to be employed with the handle and heater of an electric soldering iron.

Having in view these objects and others which will be pointed out in the following description, I will now refer to the drawing, in which Figure 1 is a view in perspective of a fragment of a tire which is being cut, the view showing also the entire cutting tool in its operative position.

Figure 2 is a lengthwise section through a portion of the tire showing the groove which is cut therein and also showing the position of the cutting tool.

Figure 3 is a view in perspective of my cutting tool in place in the shoe.

Figure 4 is a view in perspective of my cutting tool when removed from the shoe.

Figure 5 is a cross sectional view through the block of the shoe and showing the shank of the cutting tool with the air insulation between the block and the shank.

The invention is designed for use primarily with an electric soldering iron as shown in Figure 1. All such soldering irons have means 10 for connection with a source of electrical energy which is converted into heat for heating the soldering iron. Such tools are also provided with a handle 11 and a cylindrical member 12 having the heating elements. The cylindrical member 12 is made to receive the shank of a soldering iron which is held in place by means of a set screw 13. Thus far the construction is of common knowledge since nearly all electric soldering irons involve all of the elements above described. This part of the soldering iron is used in connection with my invention which merely replaces the soldering iron proper which must first be removed from the cylindrical element 12.

Referring now to Figures 3 and 4, the cutter has a shank 14, a flattened surface 15 and a channeled portion 16, the channeled portion terminating in two vertical cutting edges 17 and a horizontal cutting edge 18. The lateral and bottom sides are tapered very gradually on the outer side of the cutting tool so that resharpening of the cutters may be done on any convenient sharpening stone to avoid the necessity of special tools for sharpening the cutters.

The shoe includes a lower surface which is adapted to bear against the surface of the tire, a pair of side walls and a block positioned between the side walls. The block 19 is provided with a cylindrical bore which is forwardly and downwardly inclined with reference to the bottom of the shoe. The cutter passes through the cylindrical bore and it may be held in any adjusted position by means of the set screw 20 which passes through a screw threaded aperture in the block 19 and which bears against the flattened surface 15 all as best shown in Figure 5. Adjustment of the cutter in a forward direction in the shoe will increase the depth of cut while adjustment in the rearward direction will decrease the depth of cut.

The bottom 21 of the shoe is slotted for the passage therethrough of the cutter which assumes the position shown in Figure 2 with reference to the shoe. It will be clearly evident that the groove in Figure 2 may be made as shallow or as deep as is desired or required by merely adjusting the cutter in the shoe.

The shoe is so shaped that it will ride easily over the surface of the tire and so that it can be easily guided in its movements. The cutter is heated to a temperature sufficient to render the rubber soft enough for easy cutting. The shoe must also be kept warm but the temperature of the shoe must be below that of the cutter. This is accomplished by heating the cutter directly and by heating the shoe by a partial transfer of the heat from the cutter to the shoe.

The depth of the cut may easily be regulated by the position of the cutter in the shoe. The cuts in the original tire come in very few standard widths and for this reason it is necessary to provide several cutters like the one shown in Figure 4, the cutters having various cutting widths. By making the shanks of uniform diameter, these cutters are interchangeable in the shoe so that the cutter of the most desirable width may be employed.

Having thus described my invention in such full, clear, and exact terms that its construction and operation will be readily understood by others skilled in the art to which it pertains, what I claim as new and desire to secure by Letters Patent of the United States is:

1. A tire retreading tool including a shoe and a cutting member in partial intimate contact and in partial separation, and means for directly heating said cutting member whereby the retarded heat transfer from said cutting member to said shoe will result in the heating of said shoe to a temperature below that of said cutting member.

2. A tire retreading tool including a shoe adapted to be pushed over the surface of the tire, a cutting member intersecting said shoe and projecting therebeneath at its forward extremity, means for the forward or rearward adjustment of said cutting member in said shoe, said cutting member having three cutting edges for cutting the rubber to form the sides and bottom of the groove, said cutting edges being arranged in U-form and in sharp angular relationship, means for heating said cutting member, and a partial insulation between said cutting member and said shoe whereby said shoe will be heated to a lower temperature than the temperature of the said cutting member through the retarded heat transfer from said cutting member to said shoe.

3. A tire retreading tool including a cutting member having a shank provided with a groove at its forward extremity and being beveled at the two sides and bottom to provide three cutting edges for cutting the rubber to form the two sides and the bottom of the groove in the tire, a shoe provided with a forwardly and downwardly inclined bore for adjustably receiving said shank, a set screw in said shoe for securing said shank in adjusted position, and means for directly heating said cutting member during operation and for indirectly heating said shoe by the partial transfer of heat from said cutting member to said shoe.

JAY B. FOX.